United States Patent
Yamasaki

(10) Patent No.: US 11,261,565 B2
(45) Date of Patent: Mar. 1, 2022

(54) DEFIBRATION PROCESSING DEVICE, AND FIBROUS FEEDSTOCK RECYCLING DEVICE

(71) Applicant: SEIKO EPSON CORPORATION, Tokyo (JP)

(72) Inventor: Keigo Yamasaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 460 days.

(21) Appl. No.: 16/366,080

(22) Filed: Mar. 27, 2019

(65) Prior Publication Data

US 2019/0301092 A1    Oct. 3, 2019

(30) Foreign Application Priority Data

Mar. 28, 2018    (JP) .............................. JP2018-061333

(51) Int. Cl.
| | |
|---|---|
| *D21B 1/08* | (2006.01) |
| *D21B 1/06* | (2006.01) |
| *D21B 1/10* | (2006.01) |
| *D21D 1/38* | (2006.01) |
| *D21D 1/18* | (2006.01) |
| *D21F 9/00* | (2006.01) |

(52) U.S. Cl.
CPC ............... *D21B 1/08* (2013.01); *D21B 1/063* (2013.01); *D21B 1/10* (2013.01); *D21D 1/18* (2013.01); *D21D 1/38* (2013.01); *D21F 9/00* (2013.01)

(58) Field of Classification Search
CPC . D21B 1/08; D21B 1/10; D21B 1/063; D21D 1/38; D21D 1/18
See application file for complete search history.

(56) References Cited

U.S. PATENT DOCUMENTS

| | | | | |
|---|---|---|---|---|
| 2,909,334 A | * | 10/1959 | Gunnar | ..................... B02C 4/10 241/46.01 |
| 4,614,307 A | * | 9/1986 | Lauser | ................... B29B 9/065 241/101.4 |
| 5,564,635 A | | 10/1996 | Terada et al. | |
| 5,803,374 A | * | 9/1998 | Beckschulte | ....... B01F 13/0205 241/27 |

(Continued)

FOREIGN PATENT DOCUMENTS

| | | |
|---|---|---|
| JP | H07-102493 A | 4/1995 |
| JP | 4689016 B2 | 5/2011 |
| JP | 2015-074848 A | 4/2015 |

*Primary Examiner* — Anthony Calandra
(74) *Attorney, Agent, or Firm* — Oliff PLC

(57) ABSTRACT

A defibration processing device is capable of efficient defibration in a multiple stage rotating part, and a fibrous feedstock recycling device. The defibration processing device has a first rotating part disposed on a side into which defibration feedstock flows, and a second rotating part disposed on a side to which defibrated material defibrated in the first rotating part is discharged. The first rotating part and second rotating part each have on the axis of rotation side thereof a base, and a protruding part protruding from the base in a direction away from the axis of rotation. A spacer is between the first rotating part and second rotating part. An external restriction plate protrudes from the stationary part side toward the spacer, and an internal restriction plate protrudes from the axis of rotation side of the first rotating part and second rotating part toward the stationary part.

8 Claims, 8 Drawing Sheets

(56) References Cited

U.S. PATENT DOCUMENTS

| | | | |
|---|---|---|---|
| 6,637,682 B2* | 10/2003 | Akiyama | B02C 13/14 |
| | | | 241/188.1 |
| 9,422,664 B2 | 8/2016 | Higuchi et al. | |
| 9,643,339 B2 | 5/2017 | Higuchi et al. | |
| 9,869,057 B2 | 1/2018 | Higuchi et al. | |
| 2007/0034290 A1* | 2/2007 | Wenzlick, III | B02C 13/06 |
| | | | 144/218 |
| 2010/0006683 A1* | 1/2010 | Fukuhiro | B02C 13/2804 |
| | | | 241/189.1 |
| 2010/0206973 A1* | 8/2010 | Cotter | B02C 13/2804 |
| | | | 241/192 |

* cited by examiner

DEFIBRATION PROCESSING DEVICE, AND FIBROUS FEEDSTOCK RECYCLING DEVICE

BACKGROUND

1. Technical Field

The present invention relates to a defibration processing device, and a fibrous feedstock recycling device.

2. Related Art

Systems for recycling feedstock containing fiber are known from the literature. For example, JP-A-2015-074848 describes a structure configuring a rotating cutter from a stack of multiple rotating blades with protrusions for use in the construction of a dry process defibration processing device to defibrate feedstock without excessively shortening the fiber length in order to make a sheet with practical strength.

The dry process data to be printed described in JP-A-2015-074848 forms rotating parts in multiple stages, and defibrates the material to be defibrated (referred to below as defibration material) by the multiple stages of rotating parts. However, the length of time the defibrated material defibrated by the first stages remains in the latter stages of the rotating parts formed in multiple stages is short, and efficiently defibrating the feedstock may be difficult.

SUMMARY

The present invention is directed to this problem, and provides a defibration processing device and a fibrous feedstock recycling device enabling efficient defibration in a defibrator having rotating parts configured in multiple stages.

To achieve the foregoing object, a defibration processing device according to the invention has a rotating part; and a stationary part disposed separated from the rotating part in a direction away from the axis of rotation of the rotating part. The rotating part has a first rotating part disposed on a side into which defibration feedstock flows, and a second rotating part disposed on a side to which defibrated material defibrated in the first rotating part is discharged. The first rotating part and second rotating part each have on the axis of rotation side thereof a base, and a protruding part protruding from the base in a direction away from the axis of rotation; a spacer disposed on the rotating part side between the first rotating part and second rotating part, an external restriction plate protruding from the stationary part side toward the spacer, and an internal restriction plate protruding from the axis of rotation side of the rotating part toward the stationary part.

When defibration feedstock flows through the gap between the external restriction plate and spacer and the gap between the internal restriction plate and stationary part, and into the second rotating part, an eddy current is produced inside the second rotating part. As a result, the time the defibration feedstock is inside the second rotating part can be increased, and the second rotating part can efficiently defibrate the feedstock.

Preferably, the gap between an outside edge of the internal restriction plate and the stationary part is smaller than the gap between an inside edge of the external restriction plate and the spacer.

In another aspect of the invention, the internal restriction plate is disposed between the first rotating part and the spacer, and an inside edge of the external restriction plate is disposed between the second rotating part and the internal restriction plate.

In another aspect of the invention, the internal restriction plate is disposed between the second rotating part and the spacer, and an inside edge of the external restriction plate is disposed between the first rotating part and the internal restriction plate.

Another aspect of the invention may be configured with an external restriction plate disposed on a side of the first rotating part into which the defibration feedstock flows.

Another aspect of the invention may be configured with an internal restriction plate disposed on a side of the first rotating part into which the defibration feedstock flows.

In another aspect of the invention, the first rotating part and the second rotating part are each configured by stacking multiple rotating plates.

In another aspect of the invention, the rotating plates each have the base disposed on the axis of rotation side, and the protruding part protruding from the base in a direction away from the axis of rotation.

Another aspect of the invention is a fibrous feedstock recycling device comprising the defibration processing device according to the invention.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the invention are described below with reference to the accompanying figures. Note that the embodiments described below do not limit the content of the embodiment described in the accompanying claims. All configurations described below are also not necessarily essential elements of the invention.

1. Embodiment 1

1. General Configuration of a Sheet Manufacturing Apparatus

Figure 1:
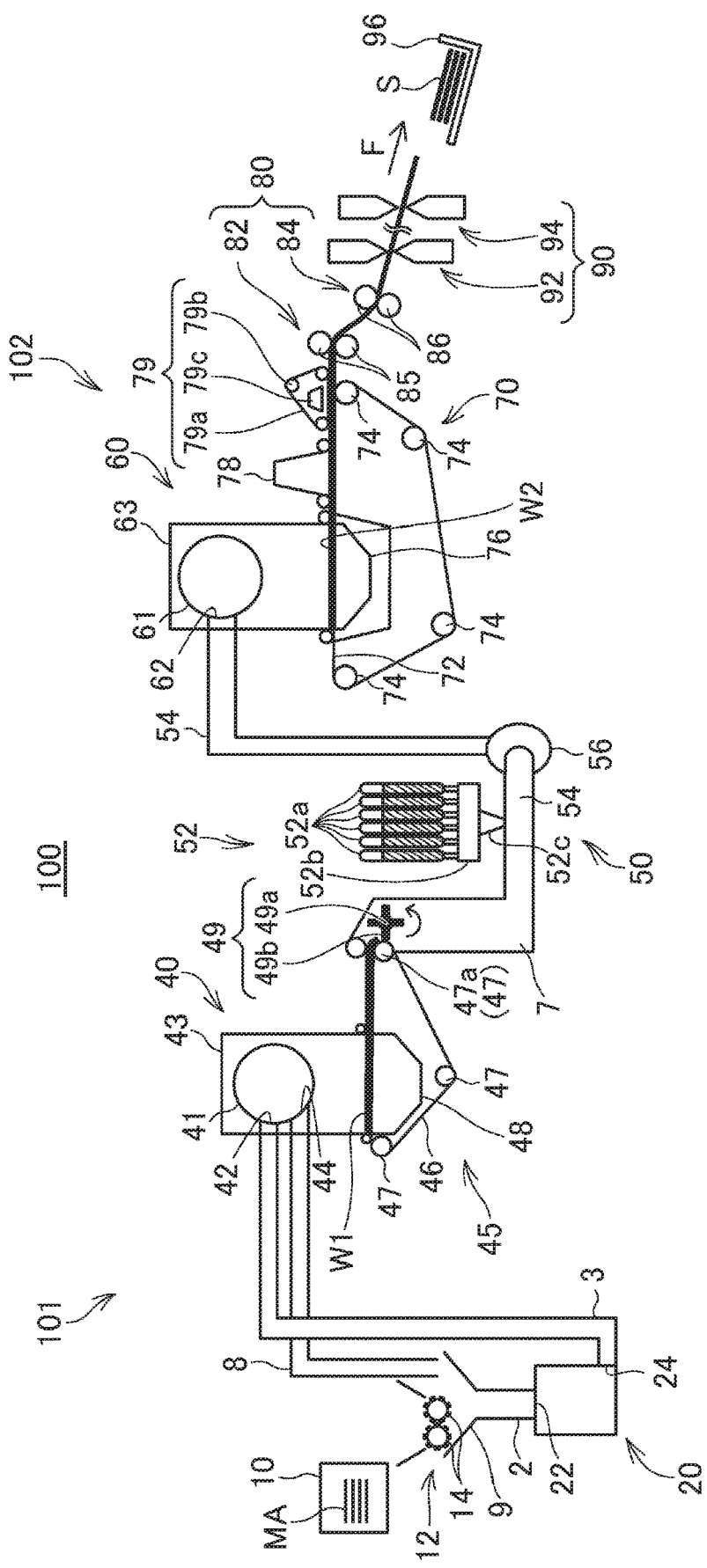
FIG. 1 schematically illustrates the configuration of a sheet manufacturing apparatus.

FIG. 1 schematically illustrates the configuration of a sheet manufacturing apparatus 100 according to the invention.

The sheet manufacturing apparatus 100 is an example of a fibrous feedstock recycling device according to the invention that executes a recycling process of extracting fiber from a feedstock material MA containing fiber and making new sheets S from the fiber. The sheet manufacturing apparatus 100 can make multiple types of sheets S, and by mixing additives with the feedstock material MA according to the application of the sheets S, can adjust the paper strength and whiteness, or add color, scents, or functions such as fire retardancy to the sheets S. The sheet manufacturing apparatus 100 can also adjust the density, thickness, size, and shape of the sheets S. Typical examples of the sheets S include office paper in standard sizes such as A4 or A3, various kinds of sheet products such as cleaning sheets for cleaning flooring, sheets for cleaning up oil and grease, and sheets cleaning toilets, as well as paper plates and other products.

The sheet manufacturing apparatus 100 includes a feedstock feeder 10, shredder 12, defibrator (defibration processing device) 20, classifier 40, first web former 45, rotor 49, mixing device 50, air-laying device 60, second web former 70, conveyor 79, sheet former 80, and sheet cutter 90. The shredder 12, defibrator 20, classifier 40, and first web former 45 configure a defibration processor 101 that defibrates the feedstock material MA and acquires material used to make the sheets S. The rotor 49, mixing device 50, air-laying device 60, second web former 70, sheet former 80, and sheet cutter 90 configure a sheet maker 102 that processes the material acquired by the defibration processor 101 and makes sheets S.

The feedstock feeder 10 in this example is an automatic sheet feeder that holds and continuously supplies the feedstock material MA to the shredder 12. The feedstock material MA may be any material containing fiber, such as recovered paper, waste paper, and pulp sheets.

The shredder 12 has shredder blades 14 that cut the feedstock material MA supplied by the feedstock feeder 10, shreds the feedstock material MA in air by the shredder blades 14, and produces paper shreds a few centimeters square. The shape and size of the shreds is not specifically limited. A paper shredder, for example, may be used as the shredder 12. The feedstock material MA shredded by the shredder 12 is then collected in a hopper 9, and conveyed through a conduit 2 to the defibrator 20.

The defibrator 20 defibrates the coarse shreds produced by the shredder 12. Defibration is a process of breaking feedstock material MA containing bonded fibers into single fibers or a few intertwined fibers. The feedstock material MA may also be referred to as material to defibrate or defibration material. By the defibrator 20 defibrating the feedstock material MA, resin particles, ink, toner, bleeding inhibitors, and other materials included in the feedstock material MA can be expected to also separate from the fibers. The material that has past through the defibrator 20 is referred to as defibrated material.

In addition to defibrated fibers that have been separated, the defibrated material may contain additives that are separated from the fiber during defibration, including resin, ink, toner, and other color additives, bleeding inhibitors, and paper strengthening agents. The resin particles contained in the defibrated material is resin that is mixed to bind fibers together when the feedstock material MA was manufactured. The shape of the fiber in the defibrated material may be as strings or ribbons. The fiber contained in the defibrated material may be as individual fibers not intertwined with other fibers, or as clumps, which are multiple fibers tangled with other defibrated material into clumps.

The defibrator 20 defibrates in a dry process. A dry process as used herein means that the defibration process is done in air instead of a wet solution. The defibrator 20 uses a defibrator such as an impeller mill in this example. More specifically, the defibrator 20 has a rotor (not shown in the figure), and a liner (not shown in the figure) positioned around the outside of the rotor, and the shreds go between the rotor and the liner and are defibrated.

The shreds are conveyed by an air current from the shredder 12 to the defibrator 20. This air current may be generated by the defibrator 20, or the air current may be produced by a blower (not shown in the figure) disposed upstream or downstream from the defibrator 20 in the conveyance direction of the shreds and defibrated material. The defibrated material is carried by the air current from the defibrator 20 through a conduit 3 to the classifier 40. The air current conveying the defibrated material to the classifier 40 may be generated by the defibrator 20 or the air current from the blower described above may be used.

The classifier 40 separates the components of the defibrated material defibrated by the defibrator 20 by the size of the fiber. The size of the fiber primarily indicates the length of the fiber. The classifier 40 includes a drum 41, and a housing 43 around the drum 41. The drum 41 in this example is a sieve. More specifically, the drum 41 has mesh, a filter or a screen with openings that functions as a sieve. More specifically, the drum 41 is a cylinder that is rotationally driven by a motor, and has mesh in at least part of the outside surface. The mesh of the drum 41 may be a metal screen, expanded metal made by expanding a metal sheet with slits formed therein, or punched metal, for example.

Defibrated material introduced from the inlet 42 to the drum 41 is separated by rotation of the drum 41 into precipitate that passes through the openings in the drum 41, and remnants that do not pass through the openings.

The precipitate that passes through the openings contains fiber and particles smaller than the openings, and is referred to as first screened material.

The remnants include fibers, undefibrated shreds, and clumps that are larger than the openings, and are referred to as second screened material.

The first screened material precipitates inside the housing 43 and descends to the first web former 45. The second screened material is conveyed through a conduit 8 to the defibrator 20 from an exit opening 44 that communicates with the inside of the drum 41.

Instead of using a sieve-type classifier 40, the sheet manufacturing apparatus 100 may use a cyclone classifier, elbow-jet classifier, or eddy classifier, for example, that selects and separates the first screened material and second screened material. Such classifiers may be configured to separate the smallest or low density material from the first screened material. For example, the classifier may be configured to separate and remove resin particles, color agents, and additives that were separated from the fibers by the defibrator 20 from the first screened material. In this case, the first screened material can be conveyed to the first web former 45 and mixing device 50 without containing fine particles of resin, color agents, and other additives.

The first web former 45 includes a mesh belt 46, tension rollers 47, and a suction device (suction mechanism) 48. The mesh belt 46 is an endless metal belt, and is mounted around multiple tension rollers 47. The mesh belt 46 circulates in a path configured by the tension rollers 47. Part of the path of the mesh belt 46 is flat in the area below the drum 41, and the mesh belt 46 forms a flat surface.

Numerous openings are formed in the mesh belt 46. Of the first screened material that descends from the drum 41 located above the mesh belt 46, components that are larger than the openings in the mesh belt 46 accumulate on the mesh belt 46. Components of the first screened material that are smaller than the openings in the mesh belt 46 pass through the openings.

The suction device 48 has a blower not shown, and suctions air from the opposite side of the mesh belt 46 as the drum 41. Material (components) that passes through the openings in the mesh belt 46 is pulled into the suction device 48. The air current pulled by the suction device 48 pulls the first screened material descending from the drum 41 to the mesh belt 46, and promotes accumulation on the mesh belt 46.

The material accumulated on the mesh belt 46 forms a first web W1. More specifically, the first web former 45 forms a first web W1 from the first screened material selected by the classifier 40.

The basic configuration of the mesh belt 46, tension rollers 47, and suction device 48 is basically the same as the configuration of the mesh belt 72, tension rollers 74, and suction mechanism 76 of the second web former 70 described below.

Of the components of the first screened material, the first web W1 comprises mainly fibers that are larger than the openings in the mesh belt 46, and is a fluffy web containing much air. The first web W1 is conveyed by movement of the mesh belt 46 to the rotor 49.

The rotor 49 has a base 49a connected to a driver such as a motor (not shown in the figure), and fins 49b protruding from the base 49a, and when the base 49a turns in the direction of rotation R indicated by the arrow, the fins 49b rotate around the base 49a. The fins 49b in this example are flat blades. In the example in FIG. 1, there are four fins 49b disposed equidistantly around the base 49a.

The rotor 49 is disposed at the end of the flat part of the path of the mesh belt 46. Because the path of the mesh belt 46 curves down at this end, the mesh belt 46 also curves and moves down. As a result, the first web W1 conveyed by the mesh belt 46 extends forward from the mesh belt 46 and contacts the rotor 49. The first web W1 is then broken up by the fins 49b striking the first web W1, and reduced to small clumps of fiber. These clumps then travel through the conduit 7 located below the rotor 49, and are conveyed to the mixing device 50. Because the first web W1 is a soft, fluffy structure of fiber accumulated on the mesh belt 46 as described above, the first web W1 is easily broken up by collision with the rotor 49.

The rotor 49 is positioned so that the fins 49b can contact the first web W1 but the fins 49b do not touch the mesh belt 46. The distance between the fins 49b and the mesh belt 46 at the closest point is preferably greater than or equal to 0.05 mm and less than or equal to 0.5 mm.

The mixing device 50 mixes the first screened material with an additive. The mixing device 50 has an additive supplier 52 that supplies an additive, a conduit 54 through which the first screened material and additive flow, and a mixing blower 56.

One or more additive cartridges 52a storing additives are installed to the additive supplier 52. The additive cartridges 52a may be removably installed to the additive supplier 52. The additive supplier 52 includes an additive extractor 52b that extracts additive from the additive cartridges 52a, and an additive injector 52c that injects the additive extracted by the additive extractor 52b into the conduit 54.

The additive extractor 52b has a feeder (not shown in the figure) that feeds additive in a powder or particulate form from inside the additive cartridges 52a, and removes additive from some or all of the additive cartridges 52a. The additive removed by the additive extractor 52b is conveyed to the additive injector 52c.

The additive injector 52c holds the additive removed by the additive extractor 52b. The additive injector 52c has a shutter (not shown in the figure) that opens and closes the connection to the conduit 54, and when the shutter is open, the additive extracted by the additive extractor 52b is fed into the conduit 54.

The additive supplied from the additive supplier 52 includes resin (binder) that binds multiple fibers together when heated. The resin contained in the additive melts when passing through the sheet former 80 and binds multiple fibers together. The resin may be a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination.

The additive supplied from the additive supplier 52 may contain components other than resin for binding fibers. For example, depending on the type of sheet being manufactured, the additive also include a coloring agent for coloring the fiber, an anti-blocking agent to prevent agglomeration of fibers and agglomeration of resin, or a flame retardant for making the fiber difficult to burn. The additive may also be in the form of fibers or particles.

The mixing blower 56 produces an air current flowing through a conduit 54 connecting 7 to the air-laying device 60. The first screened material conveyed from the 7 into the conduit 54, and the additive supplied by the additive supply device 52 to the conduit 54, are mixed as they pass through the mixing blower 56.

The mixing blower 56 in this example can be configured with a motor (not shown in the figure), blades (not shown in the figure) that turn as driven by the motor, and a case (not shown in the figure) housing the blades, and may be a configuration in which the blades and case are connected. In addition to blades for producing an air current, the mixing blower 56 may also include a mixer for mixing the first screened material and the additive. The mixture combined by the mixing device 50 is then conveyed by the air current produced by the mixing blower 56 to the air-laying device 60, and introduced through the inlet 62 to the air-laying device 60.

The air-laying device 60 detangles and causes the fibers in the mixture to disperse in air while precipitating to the second web former 70. If the additive supplied from the additive supply device 52 is fibrous, these additive fibers are also detangled by the air-laying device 60 and descend to the second web former 70.

The air-laying device 60 includes a drum 61, and a housing 63 that houses the drum 61. The drum 61 is a cylindrical structure configured similarly to the drum 41, for example, rotates as driven by a motor (not shown in the figure) similarly to the drum 41, and functions as a sieve. The drum 61 has openings, and the mixture detangled by rotation of the drum 61 falls through the openings.

The second web former 70 is located below the drum 61. The second web former 70 in this example includes a mesh belt 72, tension rollers 74, and a suction mechanism 76.

The mesh belt 72 is an endless metal belt similar to the mesh belt 46 described above, and is mounted around multiple tension rollers 74. The mesh belt 72 circulates in a path configured by the tension rollers 74. Part of the path of the mesh belt 72 is flat in the area below the drum 61, and the mesh belt 72 forms a flat surface. There are also many holes in the mesh belt 72.

Of the mixture falling from the drum 61 located above the mesh belt 72, components larger than the openings in the mesh belt 72 accumulate on the mesh belt 72. Components of the mixture that are smaller than the openings in the mesh belt 72 pass through the holes.

The suction mechanism 76 has a blower not shown, and suctions air from the opposite side of the mesh belt 72 as the drum 61. Material that passes through the openings in the mesh belt 72 is pulled into the suction mechanism 76. The air current suctioned by the suction mechanism 76 pulls the mixture falling from the drum 61 to the mesh belt 72, and effectively promotes accumulation of the mixture.

The air current suctioned by the suction mechanism 76 creates a down flow in the path of the mixture descending from the drum 61, and can be expected to have the effect of preventing precipitating fibers from becoming tangled. The mixture accumulated on the mesh belt 72 is laid in a web, forming a second web W2.

A wetting device 78 is disposed to the conveyance path of the mesh belt 72 downstream from the air-laying device 60. The wetting device 78 is a mist humidifier that produces and supplies a water mist to the mesh belt 72. The wetting device 78 in this example has a tank that holds water, and an ultrasonic vibrator that converts the water to mist. Because the moisture content of the second web W2 can be adjusted by the mist supplied by the wetting device 78, the mist can be expected to suppress accretion of fiber on the mesh belt 72 due to static electricity.

The second web W2 is then conveyed by the conveyor 79, separates from the mesh belt 72, and is conveyed to the sheet former 80. The conveyor 79 in this example has a mesh belt 79a, rollers 79b, and a suction mechanism 79c. The suction mechanism 79c has a blower (not shown in the figure), and produces an air current upward through the mesh belt 79a by the suction of the blower. The second web W2 is separated from the mesh belt 72 and pulled to the mesh belt 79a by this air current. The mesh belt 79a moves by rotation of the rollers 79b, and conveys the second web W2 to the sheet former 80.

Like mesh belt 46 and mesh belt 72 described above, the mesh belt 79a may be configured with an endless metal belt having openings.

By applying heat to the second web W2, the sheet former 80 binds fibers recovered from the first screened material and contained in the second web W2 by means of the resin contained in the additive.

The sheet former 80 has a compression device 82 that compresses the second web W2, and a heating device 84 that heats the second web W2 after compression by the compression device 82.

The compression device 82 comprises a pair of calender rolls 85. The compression device 82 has a hydraulic press mechanism (not shown in the figure) that applies nip pressure to the calender rolls 85, and a motor or other driver (not shown in the figure) that causes the calender rolls 85 to rotate in the direction of the heating device 84. The compression device 82 compresses and conveys the second web W2 to the heating device 84 with a specific nip pressure by the calender rolls 85.

The heating device 84 includes a pair of heat rollers 86. The heating device 84 also has a heater (not shown in the figure) that heats the surface of the heat rollers 86 to a specific temperature, and a motor or other driver (not shown in the figure) that causes the heat rollers 86 to rotate in the direction of the sheet cutter 90. The heating device 84 holds and heats the second web W2 compressed to a high density by the compression device 82, and conveys the heated second web W2 to the sheet cutter 90. The second web W2 is heated in the heating device 84 to a temperature greater than the glass transition temperature of the resin contained in the second web W2, forming a sheet S.

The sheet cutter 90 cuts the sheet S formed by the sheet former 80. In this example, the sheet cutter 90 has a first cutter 92 that cuts the sheet S crosswise to the conveyance direction of the sheet S indicated by the arrow F in the figure, and a second cutter 94 that cuts the sheet S parallel to the conveyance direction F.

The sheet cutter 90 cuts the length and width of the sheet S to a specific size, forming single sheets. The single sheets S cut by the sheet cutter 90 are then stored in the discharge tray 96. The discharge tray 96 may be a tray or stacker for holding the manufactured sheets, and the sheets S discharged to the tray can be removed and used by the user.

Parts of the sheet manufacturing apparatus 100 embody a defibration processor 101 and a sheet maker 102. The defibration processor 101 includes at least the defibrator 20, and may include the classifier 40 and first web former 45.

The defibration processor 101 makes defibrated material from feedstock material MA, or forms the defibrated material into a web configuration to make a first web W1. The output of the defibration processor 101 may be conveyed through the rotor 49 to the mixing device 50, or removed from the sheet manufacturing apparatus 100 without passing through the rotor 49 and stored. The output of the defibration processor 101 may also be sealed in specific packages in a form ready for shipping or sale.

The sheet maker 102 is a functional device for making the work product manufactured by the defibration processor 101 into sheets S, and may be referred to as a processor. The sheet maker 102 includes the mixing device 50, air-laying device 60, second web former 70, conveyor 79, sheet former 80 and sheet cutter 90, and may also include the rotor 49. The sheet maker 102 may also include the additive supply device 52.

The sheet manufacturing apparatus 100 may be configured with the defibration processor 101 and sheet maker 102 as a single integrated system, or with the defibration processor 101 and sheet maker 102 as separate devices. In this case, the defibration processor 101 is an example of a fibrous feedstock recycling device according to the invention. The sheet maker 102 is an example of a sheet forming device that processes defibrated material into sheets. Each of these components may also be conceived of as processing devices.

1-2. Defibrator Configuration

The configuration of the defibrator 20 is described next as an example of a defibration processing device according to the invention.

Figure 2:
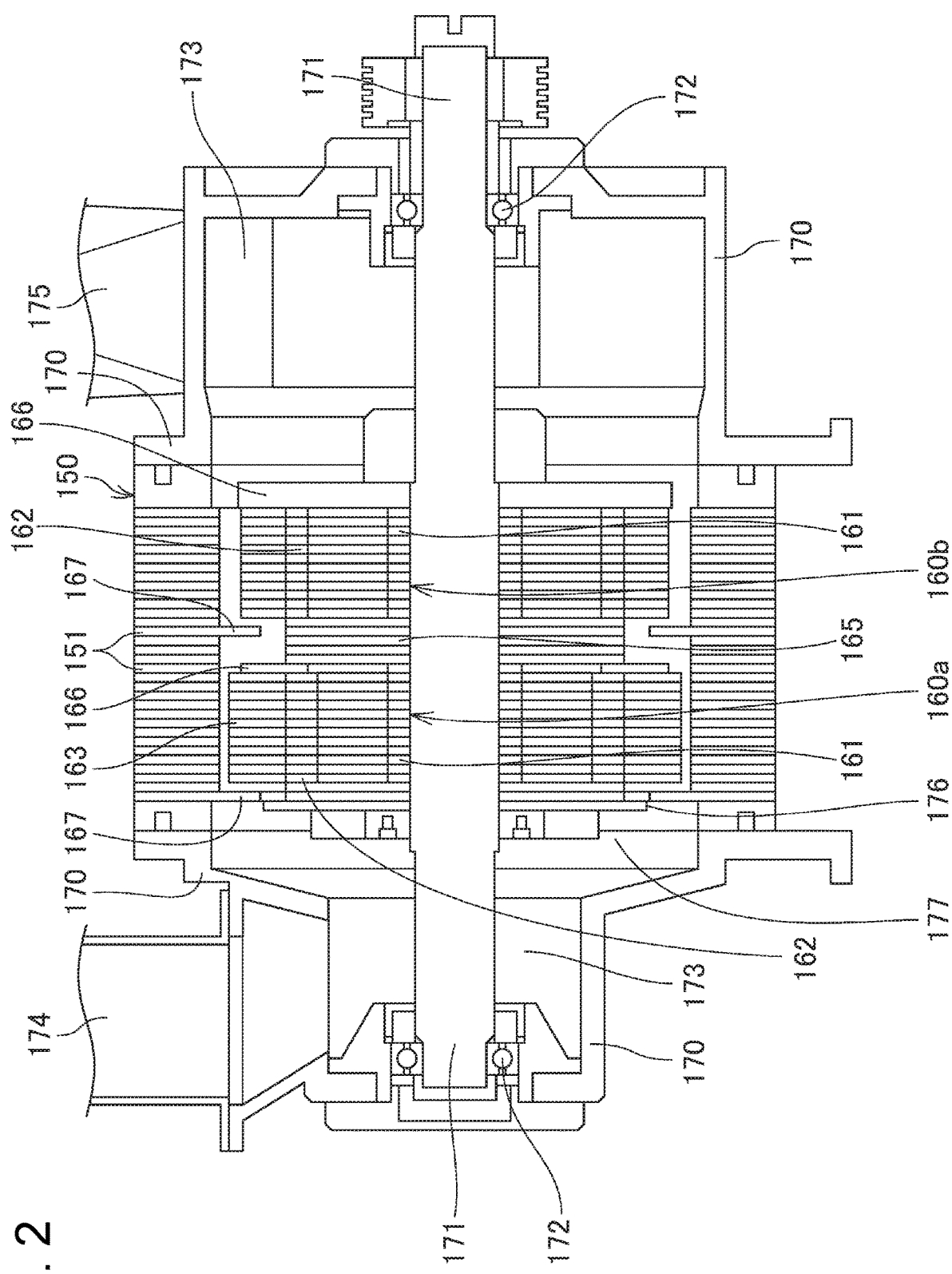
FIG. 2 is a section view of the defibrator.
Figure 3:
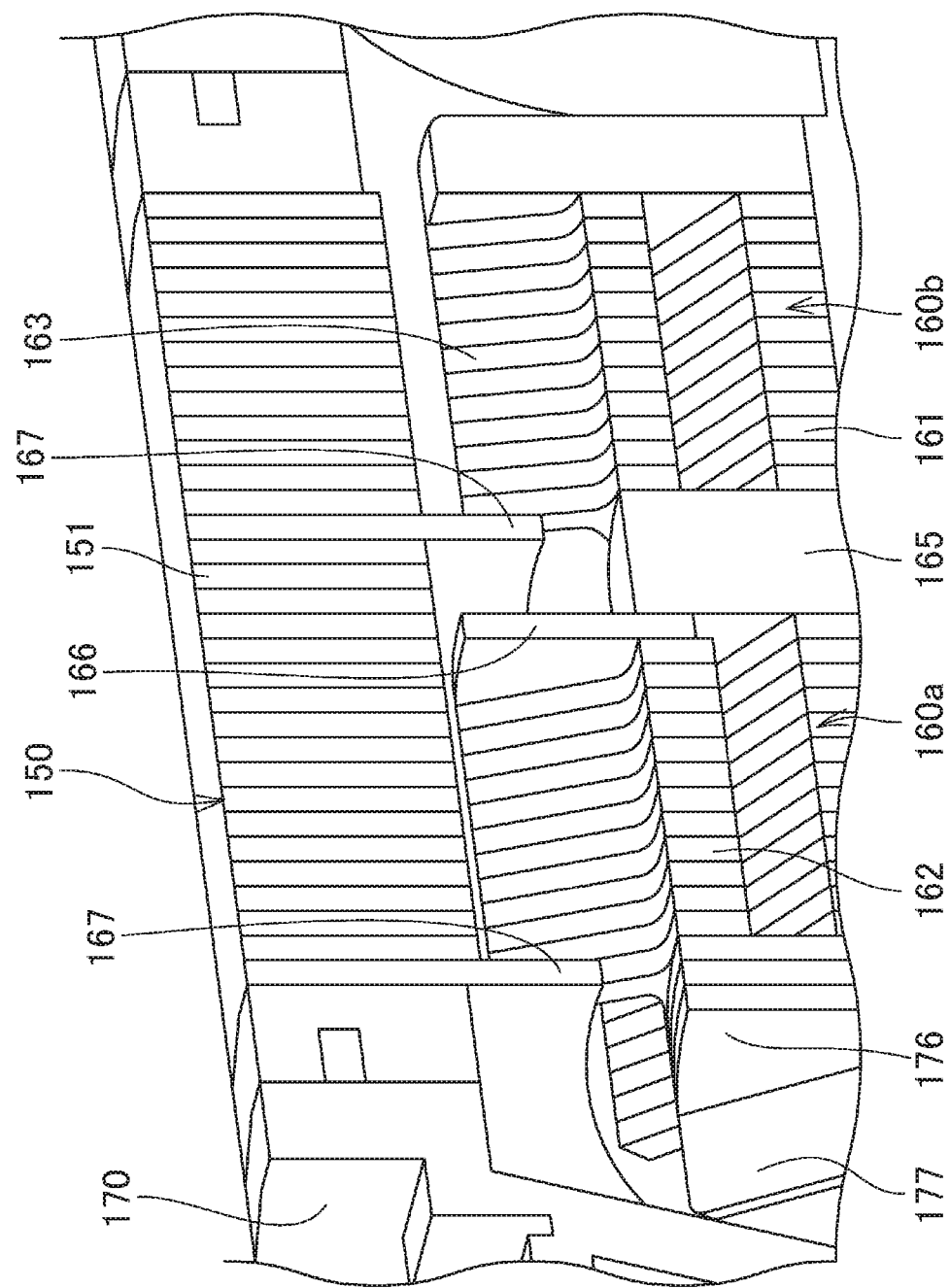
FIG. 3 is an enlarged oblique view of part of the stationary part and the rotating part of the defibrator.
Figure 4:
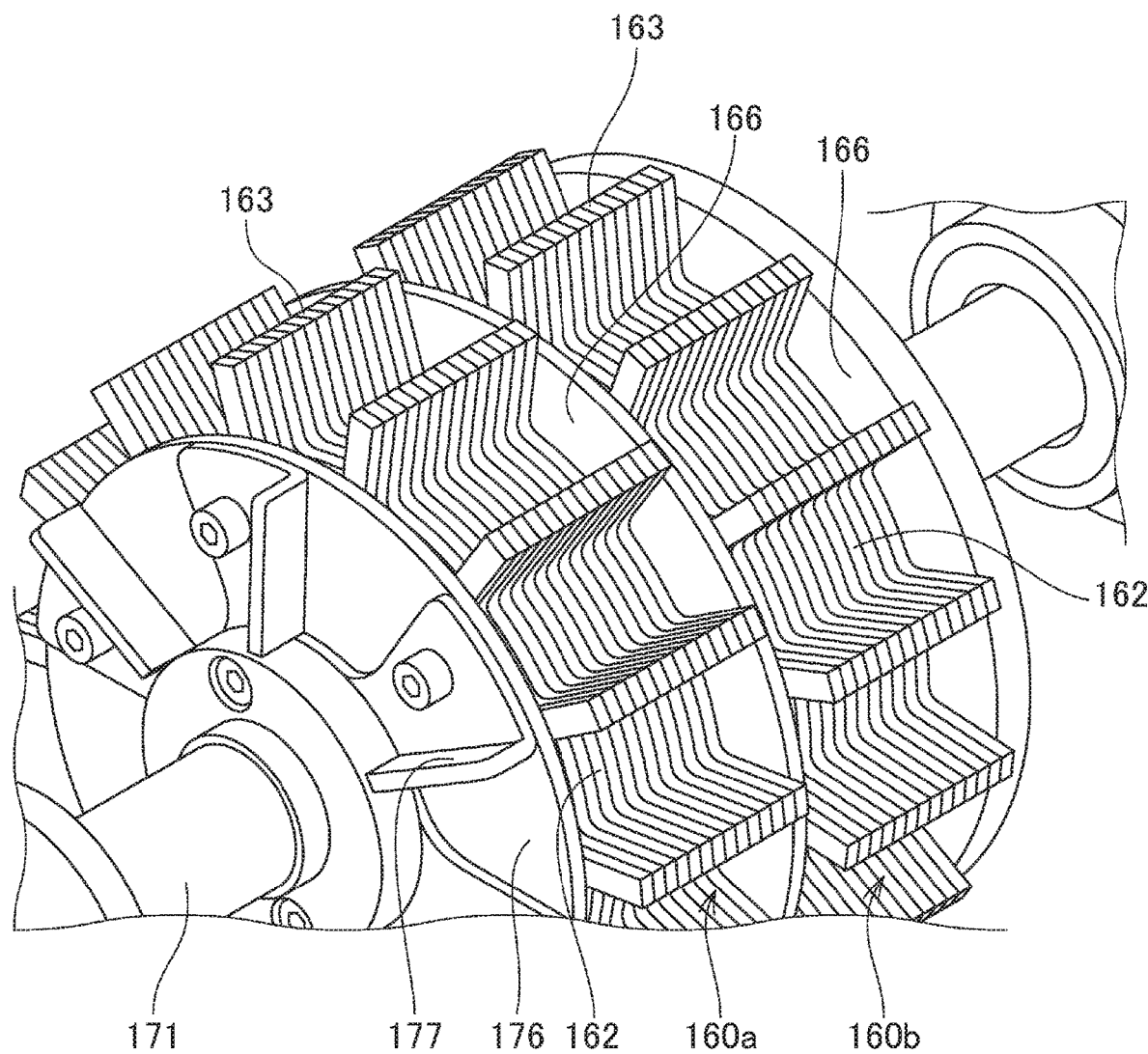
FIG. 4 is an oblique view of the rotating part.
Figure 5:
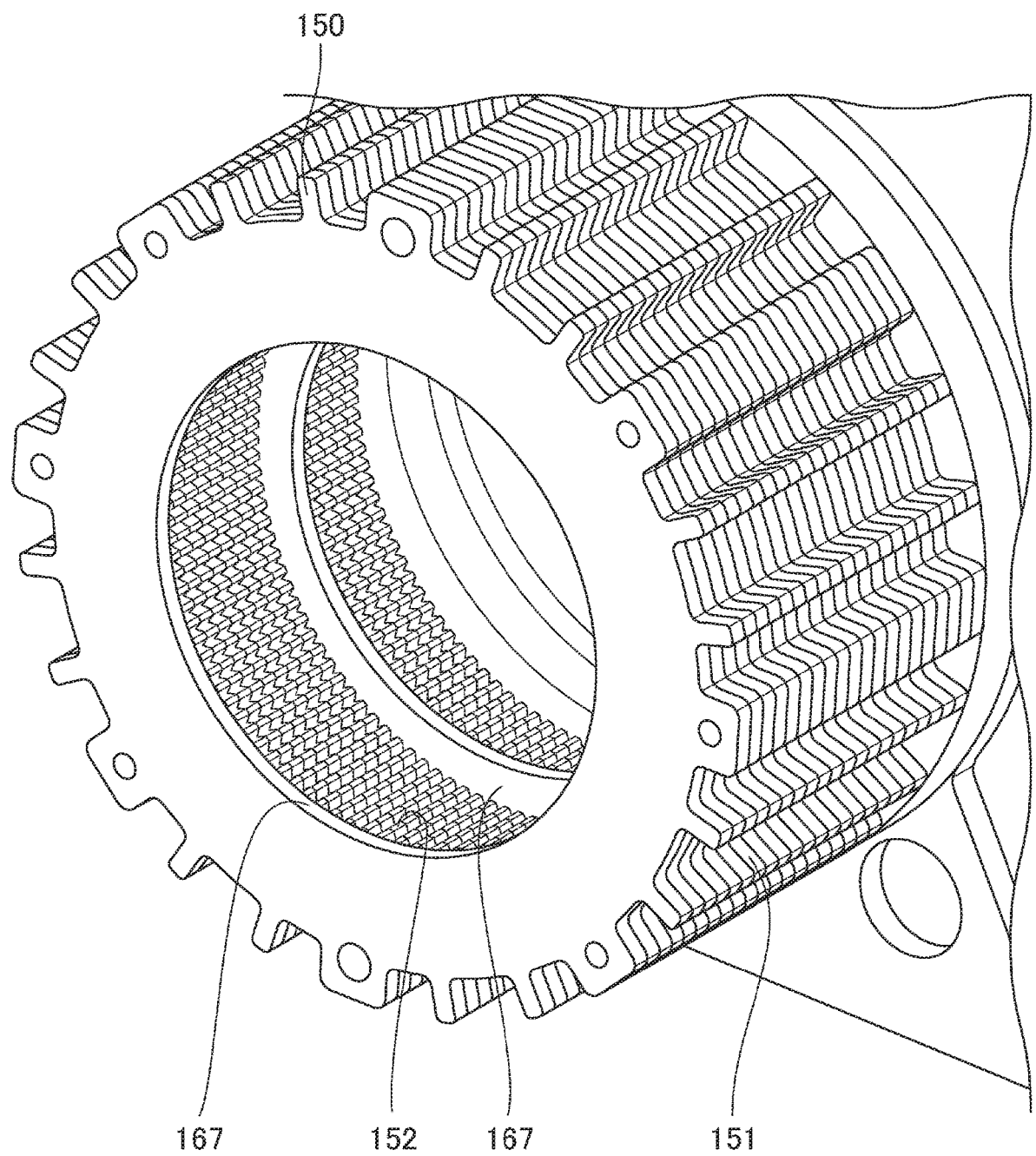
FIG. 5 is an oblique view of the stationary part.
Figure 6:
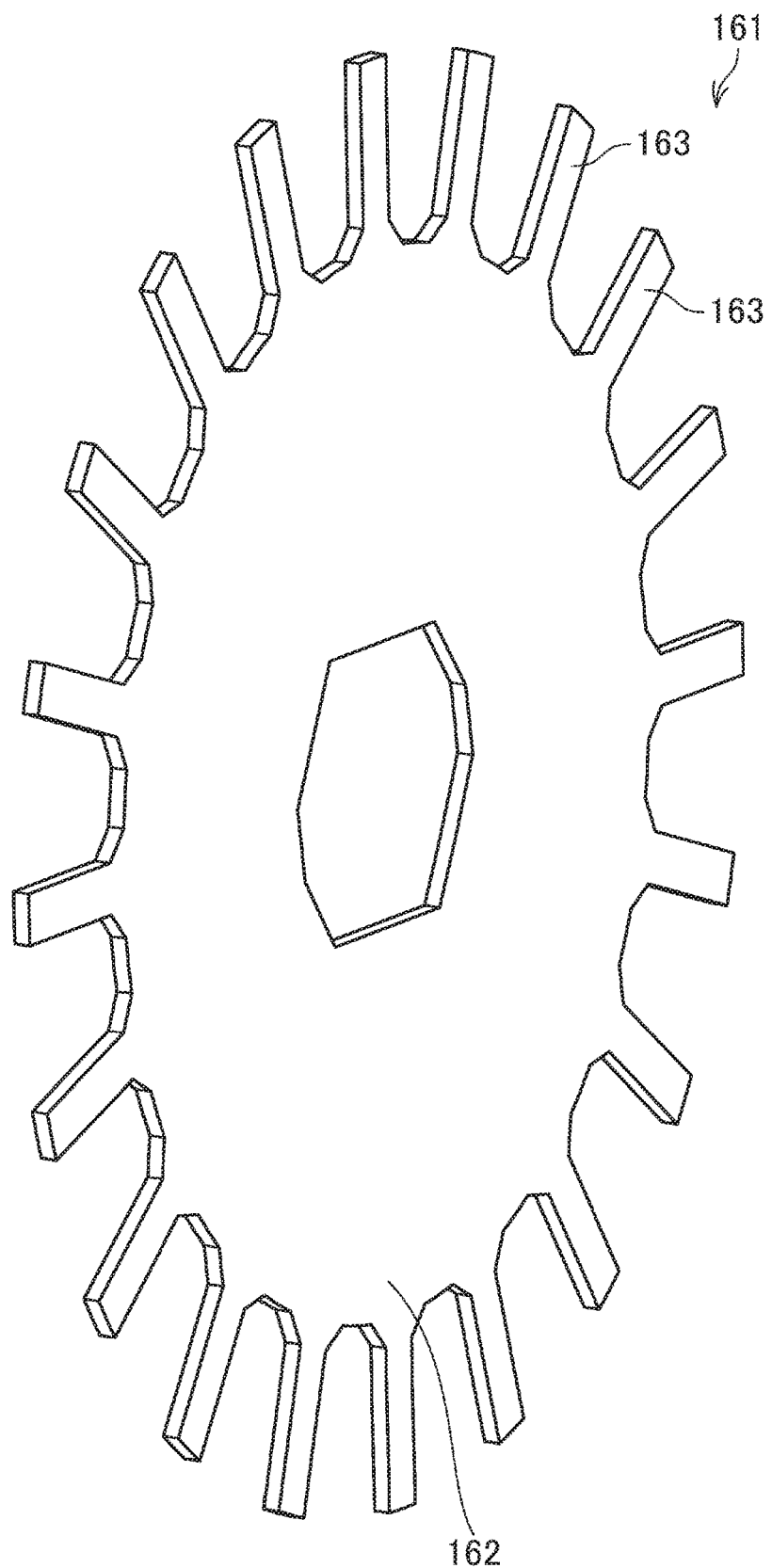
FIG. 6 is an oblique view of a rotating plate.
Figure 7:
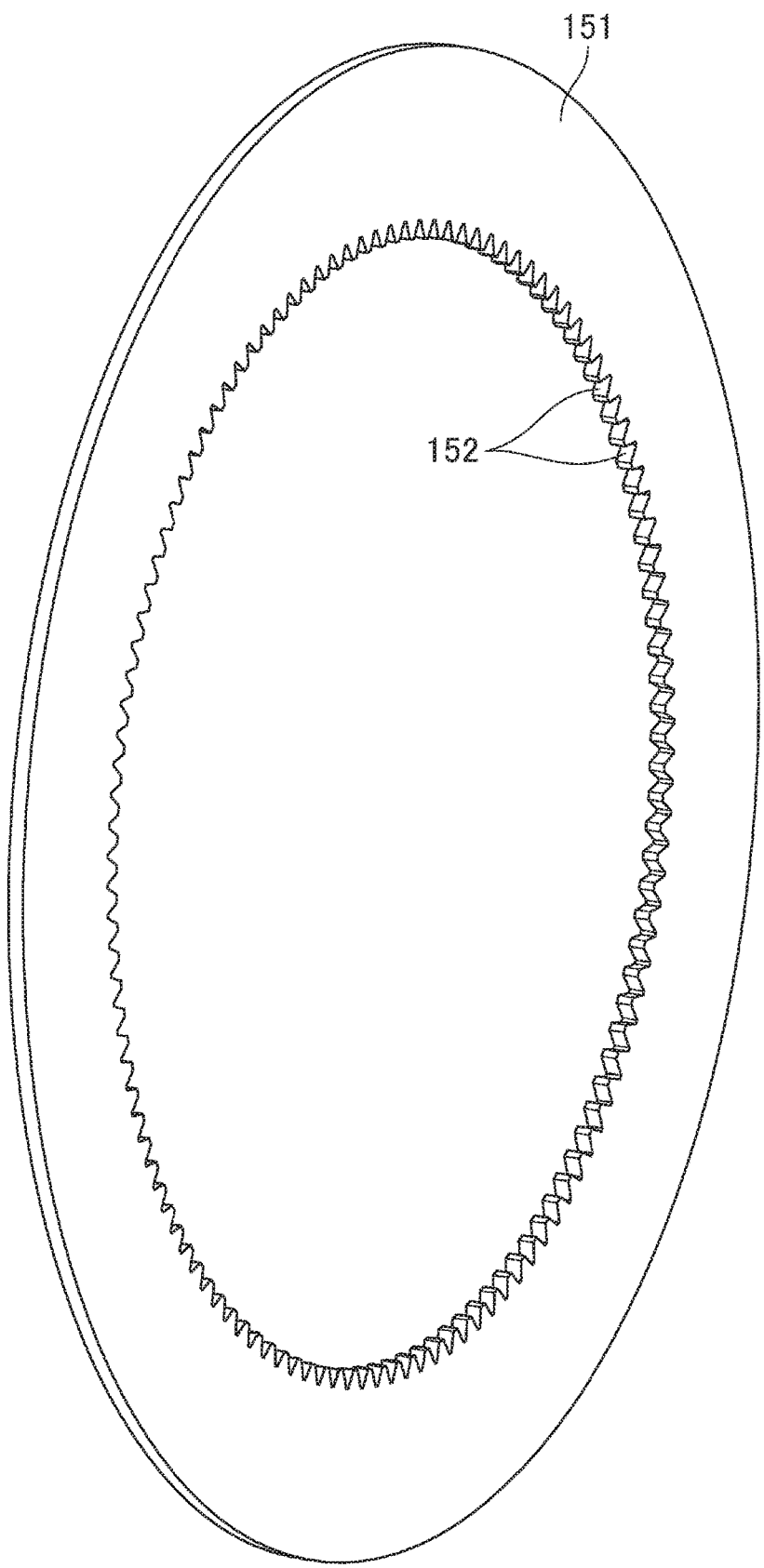
FIG. 7 is an oblique view of a stationary plate.

FIG. 2 is a section view of the defibrator 20. FIG. 3 is an enlarged oblique view of part of the stationary part and the rotating part of the defibrator. FIG. 4 is an oblique view of the rotating part. FIG. 5 is an oblique view of the stationary part. FIG. 6 is an oblique view of a rotating plate. FIG. 7 is an oblique view of a stationary plate.

The defibrator 20 according to this embodiment has a rotationally driven rotating part 160, and a stationary part 150 disposed to a position offset from the rotating part 160 in the direction away from the rotational axis of the rotating part 160.

As shown in FIG. 2, FIG. 3, and FIG. 5, the stationary part 150 is formed by multiple stationary plates 151 stacked together. As shown in FIG. 7, the stationary plates 151 are flat members that are round when seen in plan view.

Teeth 152 are formed protruding toward the axis of rotation from the inside circumference surface of the stationary plate 151. The teeth 152 are formed at an equal interval.

The thickness of the stationary plates 151 is not specifically limited. The size and number of stacked stationary plates 151 is determined appropriately according to the processing capacity of the defibrator 20, and the gap between the stationary plates 151 and the rotating part 160.

Covers 170 closing the ends of the stationary part 150 are disposed to the defibrator 20. A bearing 172 rotationally supporting the spindle 171 is disposed to each cover 170. The spindle 171 is rotationally driven by a drive mechanism not shown. Examples of the drive mechanism include mechanisms that directly turn the spindle 171 by a motor, and mechanisms that turn the spindle 171 through a belt and pulleys, chain and sprockets, gears, or other power transfer mechanism.

The covers 170 each have an internal space 173 for holding defibration feedstock or defibrated material. An input conduit 174 that communicates with the space 173 is disposed to one cover 170, and an output conduit 175 that communicates with the space 173 is disposed to the other cover 170.

The input conduit 174 is a conduit for introducing defibration feedstock to the defibrator 20, and the output conduit 175 is a conduit for discharging defibrated material defibrated by the rotating part 160 from the defibrator 20.

As shown in FIG. 2 to FIG. 4, the rotating part 160 comprises a stack of multiple rotating plates 161.

As shown in FIG. 6, each rotating blade 161 has a round base 162 through which the spindle 171 passes, and multiple fingers (protrusions) 163 protruding radially from the outside circumference of the base 162. The rotating part 160 is configured by stacking multiple rotating plates 161 side by side in the axial direction of the spindle 171. The rotating plates 161 are stacked together so that the fingers 163 overlap each other.

The rotating plates 161 can be made by stamping with a press, for example. By forming the rotating part 160 by stacking multiple rotating plates 161 together, the length of the rotating part 160 along the spindle 171 can be easily adjusted to a specific length.

The size of the rotating plates 161 can be appropriately determined according to the processing capacity of the defibrator 20, for example. The size of the base 162, and the length that the fingers 163 protrude from the base 162, are not specifically limited. The gap between the inside circumference of the rotating part 160 and the fingers 163 of the rotating plates 161 is also not specifically limited.

Note that when the rotating part 160 rotates inside the stationary part 150, the teeth 152 of the stationary part 150 function to produce an air current that detangles the defibration feedstock introduced between the inside surface of the stationary part 150 and the fingers 163 of the rotating plates 161.

A wing plate 176 is also disposed to the rotating part 160 on the input conduit 174 side in the direction of the spindle 171. Multiple wings 177 protruding in part in the direction of the spindle 171 are disposed to the wing plate 176 on the surface on the input conduit 174 side.

In this embodiment of the invention the rotating part 160 is configured as a two-stage rotating part 160. More specifically, the rotating part 160 located on the input conduit 174 side is referred to as a first rotating part 160a, and the rotating part 160 on the output conduit 175 side is referred to as a second rotating part 160b. The first rotating part 160a is a first stage, and the second rotating part 160b is a second stage. The first rotating part 160a and second rotating part 160b are disposed so that the fingers 163 of the respective rotating plates 161 are offset from each other in the circumferential direction.

A spacer 165 is disposed between the first rotating part 160a and second rotating part 160b. The outside diameter of the spacer 165 is substantially the same as the outside diameter of the bases 162 of the first rotating part 160a and second rotating part 160b.

An internal restriction plate 166 is disposed between the first rotating part 160a and the spacer 165. The internal restriction plate 166 is held between the base 162 of the first rotating part 160a and the spacer 165.

An external restriction plate 167 is disposed between the second rotating part 160b and the spacer 165. The external restriction plate 167 is held between the stationary plates 151 of the stationary part 150.

The gap between the outside edge of the internal restriction plate 166 and the stationary part 150 is smaller than the gap between the inside edge of the external restriction plate 167 and the spacer 165. More specifically, the protrusion of the internal restriction plate 166 from the base 162 is greater than the protrusion of the external restriction plate 167 from the stationary part 150.

The gap between the outside edge of the internal restriction plate 166 and the stationary part 150 is greater than the gap between the outside edge of the fingers 163 of the first rotating part 160a and the stationary part 150.

The gap between the outside edge of the fingers 163 of the first rotating part 160a and the stationary part 150 is smaller than the gap between the outside edge of the fingers 163 of the second rotating part 160b and the stationary part 150.

The gap between the external restriction plate 167 and the fingers 163 of the second rotating part 160b is smaller than the gap between the external restriction plate 167 and the internal restriction plate 166.

As a result, the air current flowing between the internal restriction plate 166 and the stationary part 150 is restricted by the air current flowing between the external restriction plate 167 and the spacer 165, and an eddy current can be produced by the air current flowing through the internal restriction plate 166 and external restriction plate 167.

More specifically, in this example, if the distance from the outside surface of the base 162 and the inside surface of the stationary part 150 is 25 mm, the length of the first rotating part 160a and second rotating part 160b along the axis of rotation is each 40 mm, and the length of the spacer 165 along the axis of rotation is 10 mm. The distance between the outside edge of the internal restriction plate 166 and the stationary part 150 is 5 mm, and the distance between the inside edge of the external restriction plate 167 and the base 162 is 10 mm.

This is only one example, and the invention is not so limited. Insofar as the gap between the outside edge of the internal restriction plate 166 and the stationary part 150 is smaller than the gap between the inside edge of the external restriction plate 167 and the bases 162 of the first rotating part 160a and second rotating part 160b, the specific dimensions may be set appropriately.

An external restriction plate 167 is also disposed between the cover and the end of the stationary part 150 on the input conduit 174 side. This external restriction plate 167 is held sandwiched between the end of the stationary part 150 and the cover. The external restriction plate 167 is formed to the same inside diameter as the external restriction plate 167 disposed between the second rotating part 160*b* and the spacer 165.

An internal restriction plate 166 is also disposed to the end of the second rotating part 160*b* on the output conduit 175 side. This internal restriction plate 166 is also formed to the same outside diameter as the internal restriction plate 166 disposed between the first rotating part 160*a* and the spacer 165.

A wing plate 176 is attached to the end of the rotating part 160 on the input conduit 174 side in the direction along the spindle 171. Multiple wings 177 protruding in part in the direction of the spindle 171 are disposed to the wing plate 176 on the surface on the input conduit 174 side.

Operation of the defibrator 20 is described next.

The defibrator 20 can defibrate defibration feedstock in a dry process by turning the spindle 171 to rotate the first rotating part 160*a* and second rotating part 160*b*, and introducing defibration feedstock by an air current through the space between the first rotating part 160*a* and second rotating part 160*b* and the stationary part 150.

The defibration feedstock is introduced from the input conduit 174 of the defibrator 20, churned by the wings 177 in the space 173 inside the cover 170, and fed from the outside circumference side of the wing plate 176 to the space between the fingers 163 of the first rotating part 160*a*.

Because of the external restriction plate 167, the defibration feedstock fed to the space inside the cover passes the gaps between the external restriction plate 167 and the base 162 of the first rotating part 160*a*, and into the first rotating part 160*a*. An eddy current is produced inside the first rotating part 160*a* as the defibration feedstock flows through the narrow space between the external restriction plate 167 and the base 162 of the first rotating part 160*a*. As a result, the defibration feedstock conveyed to the first rotating part 160*a* is easily stopped by the eddy current in the first rotating part 160*a*, and the length of time the defibration feedstock remains in the first rotating part 160*a* can be increased.

While the defibration feedstock is in the first rotating part 160*a*, the feedstock can be defibrated between the distal ends of the fingers 163 of the rotating plates 161 and the teeth 152 of the stationary part 150. Because the feedstock can be held in the first rotating part 160*a* for a longer time, there are more opportunities for the defibration feedstock to collide with the defibration points between the stationary part 150 and fingers 163 in the first rotating part 160*a*, and the feedstock can be efficiently defibrated.

The defibrated material defibrated in the first rotating part 160*a* is then conveyed through the space between the internal restriction plate 166 and stationary part 150 to the outside circumference side of the spacer 165. The defibrated material is then conveyed through the gap between the external restriction plate 167 and the base 162 to the spaces between the fingers 163 of the second rotating part 160*b*.

An eddy current is also produced inside the second rotating part 160*b* when the defibrated material flows from the internal restriction plate 166 through the narrow gap between the external restriction plate 167 and the base 162. As a result, the defibrated material conveyed to the second rotating part 160*b* is easily left in the second rotating part 160*b* by the eddy current, and the length of time the defibrated material remains in the second rotating part 160*b* can be increased.

While the defibrated material remains in the second rotating part 160*b*, the defibrated material can be defibrated between the distal ends of the fingers 163 of the rotating plates 161 and the teeth 152 of the stationary part 150. Because the feedstock can be held in the second rotating part 160*b* for a longer time, there are more opportunities for the defibration feedstock to collide with the defibration points between the stationary part 150 and fingers 163 in the second rotating part 160*b*, and the feedstock can be efficiently defibrated.

The defibrated material defibrated by the second rotating part 160*b* is then conveyed through the space between the internal restriction plate 166 and stationary part 150 to the space inside the cover 170, and is conveyed therefrom to the next process.

As described above, this embodiment of the invention has a first rotating part 160*a* on the side into which the defibration feedstock flows, and a second rotating part 160*b* on the side from which the defibrated material defibrated by the first rotating part 160*a* is discharged.

The first rotating part 160*a* and second rotating part 160*b* each have a base 162 on the axis of rotation side, and fingers 163 that protrude from the base 162 in the direction away from the axis of rotation.

A spacer 165 is disposed between the first rotating part 160*a* and second rotating part 160*b*.

An external restriction plate 167 protrudes from the stationary part 150 side toward the spacer 165, and an internal restriction plate 166 protrudes toward the stationary part 150 from the axis of rotation side of the first rotating part 160*a* and second rotating part 160*b*.

As a result, an eddy current can be produced inside the second rotating part 160*b* when defibrated material flows through the gap between the external restriction plate 167 and the spacer 165, and through the gap between the internal restriction plate 166 and the stationary part 150. The length of time the defibrated material remains inside the second rotating part 160*b* can therefore be increased, and a more efficient defibration process can be executed by the second rotating part 160*b*.

In this embodiment of the invention the gap between the outside edge of the internal restriction plate 166 and the stationary part 150 is smaller than the gap between the inside edge of the external restriction plate 167 and the spacer 165.

As a result, the air current flowing between the internal restriction plate 166 and stationary part 150 is restricted by the air current flowing between the external restriction plate 167 and the base 162, and an eddy current can be produced by the air current flowing from the internal restriction plate 166 to the external restriction plate 167.

In this embodiment of the invention an internal restriction plate 166 is disposed between the first rotating part 160*a* and the spacer 165, and the inside edge of the external restriction plate 167 is located between the second rotating part 160*b* and the internal restriction plate 166.

As a result, because defibrated material flows from the first rotating part 160*a* sequentially past the internal restriction plate 166 and external restriction plate 167 into the second rotating part 160*b*, an eddy current can be produced inside the second rotating part 160*b*. As a result, the defibrated material can be kept inside the second rotating part 160*b* for a longer time, and more efficient defibration by the second rotating part 160*b* is possible.

This embodiment of the invention also has an external restriction plate 167 disposed to the side of the first rotating part 160*a* from which the defibration feedstock flows in.

As a result, an eddy current can be produced by the external restriction plate 167 inside the first rotating part 160*a*. The defibrated material can therefore be kept inside the first rotating part 160*a* for a longer time, and can be defibrated more efficiently by the first rotating part 160*a*.

In this embodiment of the invention the first rotating part 160a and second rotating part 160b are configured by stacking together multiple rotating plates.

By configuring the first rotating part 160a and second rotating part 160b by stacking multiple rotating plates 161 together, the individual rotating plates 161 can be easily made by stamping with a press, for example. As a result, the first rotating part 160a and second rotating part 160b can be easily manufactured. In addition, by stacking the rotating plates 161, the first rotating part 160a and second rotating part 160b can be easily configured to the desired length in the direction along the spindle 171 of the rotating part.

Embodiment 2

A second embodiment of the invention is described next. Note that like parts in this embodiment and the first embodiment are identified by like reference numerals, and further description thereof is omitted.

Figure 8:
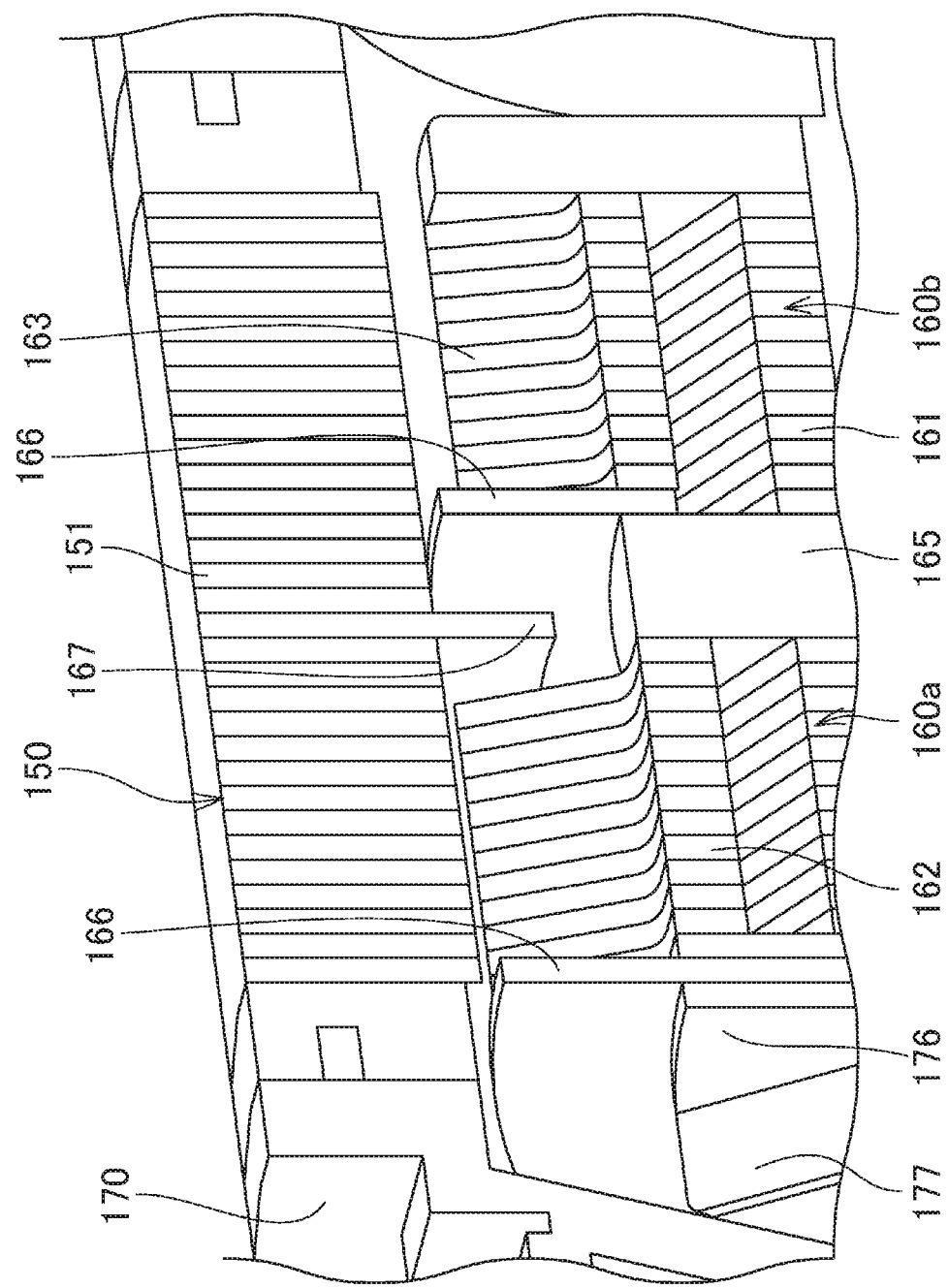
FIG. 8 is an oblique view of a defibrator according to a second embodiment of the invention.

FIG. 8 is a section view illustrating the second embodiment of the invention.

In this embodiment, as shown in FIG. 8, an external restriction plate 167 is disposed between the first rotating part 160a and the spacer 165, and an internal restriction plate 166 is disposed between the second rotating part 160b and the spacer 165. In other words, the locations of the external restriction plate 167 and internal restriction plate 166 in the second embodiment are reversed from the locations in the first embodiment.

In addition, an internal restriction plate 166 is disposed at the end of the first rotating part 160a on the input conduit 174 side, and an external restriction plate 167 is disposed at the end of the stationary part 150 on the output conduit 175 side.

The gap between the outside edge of the internal restriction plate 166 and the stationary part 150 is smaller than the gap between the inside edge of the external restriction plate 167 and the spacer 165. More specifically, the length of protrusion of the internal restriction plate 166 from the base 162 is greater than the length of protrusion of the external restriction plate 167 from the stationary part 150.

The gap between the outside edge of the internal restriction plate 166 and the stationary part 150 is smaller than the gap between the outside edge of the fingers 163 of the second rotating part 160b and the stationary part 150.

The gap between the outside edge of the fingers 163 of the first rotating part 160a and the stationary part 150 is smaller than the gap between the outside edge of the fingers 163 of the second rotating part 160b and the stationary part 150.

The gap between the external restriction plate 167 and the fingers 163 of the first rotating part 160a is smaller than the gap between the external restriction plate 167 and the internal restriction plate 166.

As a result, the air current flowing through the external restriction plate 167 and spacer 165 is restricted by flowing between the internal restriction plate 166 and stationary part 150, and an eddy current can be produced by the air current flowing past the external restriction plate 167 and internal restriction plate 166.

Other aspects of the configuration are the same as in the first embodiment.

In this second embodiment, the defibration feedstock is introduced from the input conduit 174 of the defibrator 20, churned by the wings 177 in the space 173 inside the cover 170, and fed from the outside circumference side of the wing plate 176 to the space between the fingers 163 of the first rotating part 160a.

Because of the internal restriction plate 166 in this configuration, defibration feedstock fed into the space inside the cover is carried through the gap between the internal restriction plate 166 and the stationary part 150, and into the first rotating part 160a. An eddy current is produced inside the first rotating part 160a as the defibration feedstock flows through the narrow space between the internal restriction plate 166 and the stationary part 150.

As a result, the defibration feedstock conveyed to the first rotating part 160a is easily stopped by the eddy current in the first rotating part 160a, and the length of time the defibration feedstock remains in the first rotating part 160a can be increased.

While the defibration feedstock is in the first rotating part 160a, the feedstock can be defibrated between the distal ends of the fingers 163 of the rotating plates 161 and the teeth 152 of the stationary part 150. Because the feedstock can be held in the first rotating part 160a for a longer time, there are more opportunities for the defibration feedstock to collide with the defibration points between the stationary part 150 and fingers 163 in the first rotating part 160a, and the feedstock can be efficiently defibrated.

The defibrated material defibrated in the first rotating part 160a is then conveyed through the gap between the external restriction plate 167 and base 162 to the outside circumference side of the spacer 165. The defibrated material is then conveyed through the gap between the internal restriction plate 166 and the stationary part 150 to the spaces between the fingers 163 of the second rotating part 160b.

An eddy current is also produced inside the second rotating part 160b when the defibrated material flows from the external restriction plate 167 through the narrow gap between the internal restriction plate 166 and the base 162. As a result, the defibrated material conveyed to the second rotating part 160b is more easily left in the second rotating part 160b by the eddy current, and the length of time the defibrated material remains in the second rotating part 160b can be increased.

While the defibrated material remains in the second rotating part 160b, the defibrated material can be defibrated between the distal ends of the fingers 163 of the rotating plates 161 and the teeth 152 of the stationary part 150. Because the feedstock can be held in the second rotating part 160b for a longer time, there are more opportunities for the defibration feedstock to collide with the defibration points between the stationary part 150 and fingers 163 in the second rotating part 160b, and the feedstock can be efficiently defibrated.

The defibrated material defibrated by the second rotating part 160b is then conveyed through the space between the internal restriction plate 166 and stationary part 150 to the space inside the cover 170, and is conveyed therefrom to the next process.

As described above, this embodiment of the invention has an internal restriction plate 166 disposed between the second rotating part 160b and the spacer 165, and the inside edge of the external restriction plate 167 is disposed between the first rotating part 160a and the internal restriction plate 166.

As a result, because the defibrated material flows sequentially from the first rotating part 160a past the external restriction plate 167 and internal restriction plate 166 into the second rotating part 160b, an eddy current is produced inside the second rotating part 160b. The length of time the defibrated material remains inside the second rotating part 160b can therefore be increased, and the second rotating part 160b can defibrate more efficiently.

This embodiment also has an internal restriction plate 166 on the side of the first rotating part 160a from the defibration feedstock flows in.

As a result, an eddy current can be produced inside the first rotating part 160a by the internal restriction plate 166. The length of time the defibration feedstock remains inside the first rotating part 160a can therefore be increased, and the first rotating part 160a can defibrate more efficiently.

3. Other Embodiments

The embodiments described above are only examples of specific embodiments of the invention as described in the accompanying claims, do not limit the invention, and can be varied in many ways as described below without departing from the scope and spirit of the invention as described in the accompanying claims.

The rotating part in the embodiments described above are configured by a first rotating part 160a and second rotating part 160b, forming a two stage rotating part.

However, the invention is not so limited. For example, the rotating part may be configured with rotating parts in three or more stages. In this case, a spacer 165, external restriction plate 167, and internal restriction plate 166 are disposed between the rotating parts of each stage.

The sheet manufacturing apparatus 100 is also not limited to manufacturing sheets S, and may be configured to make rigid sheets or paperboard comprising laminated sheets, or other web products. The manufactured product is also not limited to paper, and may be nonwoven cloth. The properties of the sheets S are also not specifically limited, and may be paper products that can be used as recording, writing, or printing on (such as copier paper, plain paper); wall paper, packaging paper, color paper, drawing paper, or bristol paper. When the sheet S is nonwoven cloth, it may be common nonwoven cloth, fiber board, tissue paper, kitchen paper, vacuum filter bags, filters, liquid absorption materials, sound absorption materials, cushioning materials, or mats.

The sheet manufacturing apparatus 100 according to the foregoing embodiments describe a dry process sheet manufacturing apparatus that acquires material by defibrating feedstock in air, and manufactures sheets S using the acquired material and resin. Application of the invention is not limited to such a device, however, and can be applied to a wet process sheet manufacturing apparatus that creates a solution or slurry of feedstock containing fiber in water or other solvent, and processes the feedstock into sheets. The invention can also be applied to an electrostatic sheet manufacturing apparatus that causes material containing fiber defibrated in air to adhere to the surface of a drum by static electricity, for example, and then processes the feedstock adhering to the drum into sheets.

The entire disclosures of Japanese Patent Application No. 2018-061333 filed Mar. 28, 2018 is expressly incorporated herein by reference.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A defibration processing device comprising:
    a rotating part configured to rotate around an axis of rotation;
    a stationary part disposed separated from the rotating part in a direction away from the axis of rotation,
    the rotating part having, in a direction along the axis of rotation, a first rotating part disposed on a side into which defibration feedstock flows, and a second rotating part disposed on a side to which defibrated material defibrated in the first rotating part is discharged, the first rotating part and second rotating part each having on an axis of rotation side thereof a base, and a protruding part protruding from the base in the direction away from the axis of rotation;
    a spacer disposed, in the direction along the axis of rotation, between the base of the first rotating part and the base of the second rotating part;
    an external restriction plate protruding from the stationary part toward the spacer; and
    an internal restriction plate protruding from between the first rotating part and the second rotating part toward the stationary part, wherein:
    a gap between an outside edge of the internal restriction plate and the stationary part is smaller than a gap between an inside edge of the external restriction plate and the spacer.

2. The defibration processing device described in claim 1, wherein:
    the internal restriction plate is disposed between the first rotating part and the spacer, and an inside edge of the external restriction plate is disposed between the second rotating part and the internal restriction plate.

3. The defibration processing device described in claim 1, wherein:
    the internal restriction plate is disposed between the second rotating part and the spacer, and an inside edge of the external restriction plate is disposed between the first rotating part and the internal restriction plate.

4. The defibration processing device described in claim 1, wherein:
    the external restriction plate is disposed on a side of the first rotating part into which the defibration feedstock flows.

5. The defibration processing device described in claim 1, wherein:
    the internal restriction plate is disposed on a side of the first rotating part into which the defibration feedstock flows.

6. The defibration processing device described in claim 1, wherein:
    the first rotating part and the second rotating part are each configured by stacking multiple rotating plates.

7. The defibration processing device described in claim 6, wherein:
    the rotating plates each have the base disposed on the axis of rotation side, and the protruding part protruding from the base in a direction away from the axis of rotation.

8. A fibrous feedstock recycling device comprising the defibration processing device described in claim 1.

* * * * *